(12) United States Patent
Langela et al.

(10) Patent No.: US 11,852,242 B2
(45) Date of Patent: Dec. 26, 2023

(54) PACKING RING, SEALING DEVICE, COMPRESSOR, ROTATIONAL SYSTEM AND METHOD FOR DETECTING THE CONDITION OF WEAR

(71) Applicant: STASSKOL GMBH, Stassfurt (DE)

(72) Inventors: Marc Langela, Güsten (DE); Dennis Kranert, Aschersleben (DE); Uwe Morawa, Langenweddingen (DE)

(73) Assignee: STASSKOL GMBH, Stassfurt (DE)

( * ) Notice: Subject to any disclaimer, the term of this patent is extended or adjusted under 35 U.S.C. 154(b) by 543 days.

(21) Appl. No.: 16/482,406

(22) PCT Filed: Jan. 26, 2018

(86) PCT No.: PCT/EP2018/051948
§ 371 (c)(1),
(2) Date: Jul. 31, 2019

(87) PCT Pub. No.: WO2018/145922
PCT Pub. Date: Aug. 16, 2018

(65) Prior Publication Data
US 2019/0360596 A1 Nov. 28, 2019

(30) Foreign Application Priority Data
Feb. 10, 2017 (DE) .................. 10 2017 202 148.9

(51) Int. Cl.
*F16J 15/24* (2006.01)
*F16J 15/3296* (2016.01)
*F16J 15/26* (2006.01)

(52) U.S. Cl.
CPC .......... *F16J 15/3296* (2013.01); *F16J 15/24* (2013.01); *F16J 15/26* (2013.01)

(58) Field of Classification Search
CPC .......... F16J 15/3296; F16J 15/24; F16J 15/26
See application file for complete search history.

(56) References Cited

U.S. PATENT DOCUMENTS 2,208,976 A 7/1940 Halfpenny
2,731,285 A * 1/1956 Cummings .............. F16J 15/28
277/546

(Continued)

FOREIGN PATENT DOCUMENTS

AT 505550 B1 2/2009
AT 506811 B1 12/2009
(Continued)

OTHER PUBLICATIONS

European Office Action dated Feb. 22, 2022 for family member Application No. 18703711.4.
(Continued)

*Primary Examiner* — Vishal A Patel
(74) *Attorney, Agent, or Firm* — Hudak, Shunk & Farine Co. LPA

(57) ABSTRACT

A packing ring for a sealing device, having at least two segments that are arranged around a common main axis (X). In order to be able to detect the current condition of wear, the packing ring has at least one indicator means that indicates a position of at least one of the segments in a radial direction (R) perpendicular to the main axis (X) of the packing ring.

28 Claims, 9 Drawing Sheets

(56) References Cited

U.S. PATENT DOCUMENTS

| | | | | |
|---|---|---|---|---|
| 3,235,274 A * | 2/1966 | Cain, Jr. | ............... | F16J 15/30 277/909 |
| 3,305,241 A * | 2/1967 | Hart | ............... | F16J 15/26 277/584 |
| 3,836,158 A * | 9/1974 | Davison | ............... | F16J 15/26 277/546 |
| 4,046,387 A * | 9/1977 | Lee | ............... | F16J 15/3296 285/423 |
| 4,258,944 A * | 3/1981 | Wendel | ............... | E03C 1/122 285/298 |
| 4,413,529 A * | 11/1983 | Bissell | ............... | G01L 7/048 73/740 |
| 4,497,493 A * | 2/1985 | Sall | ............... | G01B 7/14 277/306 |
| 6,457,722 B1 * | 10/2002 | Feistel | ............... | F16J 15/26 277/546 |
| 6,692,006 B2 * | 2/2004 | Holder | ............... | F16J 15/442 277/346 |
| 7,144,477 B2 * | 12/2006 | Gleason, Jr. | ............... | D21F 3/10 162/371 |
| 8,162,325 B2 | 4/2012 | Lindner-Silwester et al. | | |
| 2006/0220498 A1 * | 10/2006 | Kremer | ............... | G01L 1/142 310/338 |
| 2008/0136115 A1 | 6/2008 | Johnson | | |
| 2009/0121440 A1 | 5/2009 | Feistel et al. | | |
| 2012/0261887 A1 * | 10/2012 | Vasagar | ............... | F16J 15/441 277/543 |
| 2013/0175762 A1 * | 7/2013 | Meller | ............... | F16J 15/16 277/500 |
| 2017/0002928 A1 | 1/2017 | Feistel | | |

FOREIGN PATENT DOCUMENTS

| | | |
|---|---|---|
| CH | 196493 A | 3/1938 |
| DE | 3507272 A1 | 9/1986 |
| DE | 19723804 A1 | 12/1998 |
| DE | 102006015327 A1 | 10/2007 |
| EP | 0203266 A1 | 12/1986 |
| EP | 1571380 A1 | 9/2005 |
| GB | 1239414 A | 7/1971 |
| JP | S54117852 A | 9/1979 |
| WO | 2015097014 A1 | 7/2015 |
| WO | 2016022136 A1 | 2/2016 |

OTHER PUBLICATIONS

Indian Office Action dated Feb. 26, 2021 for family member Application No. 201917030311.

* cited by examiner

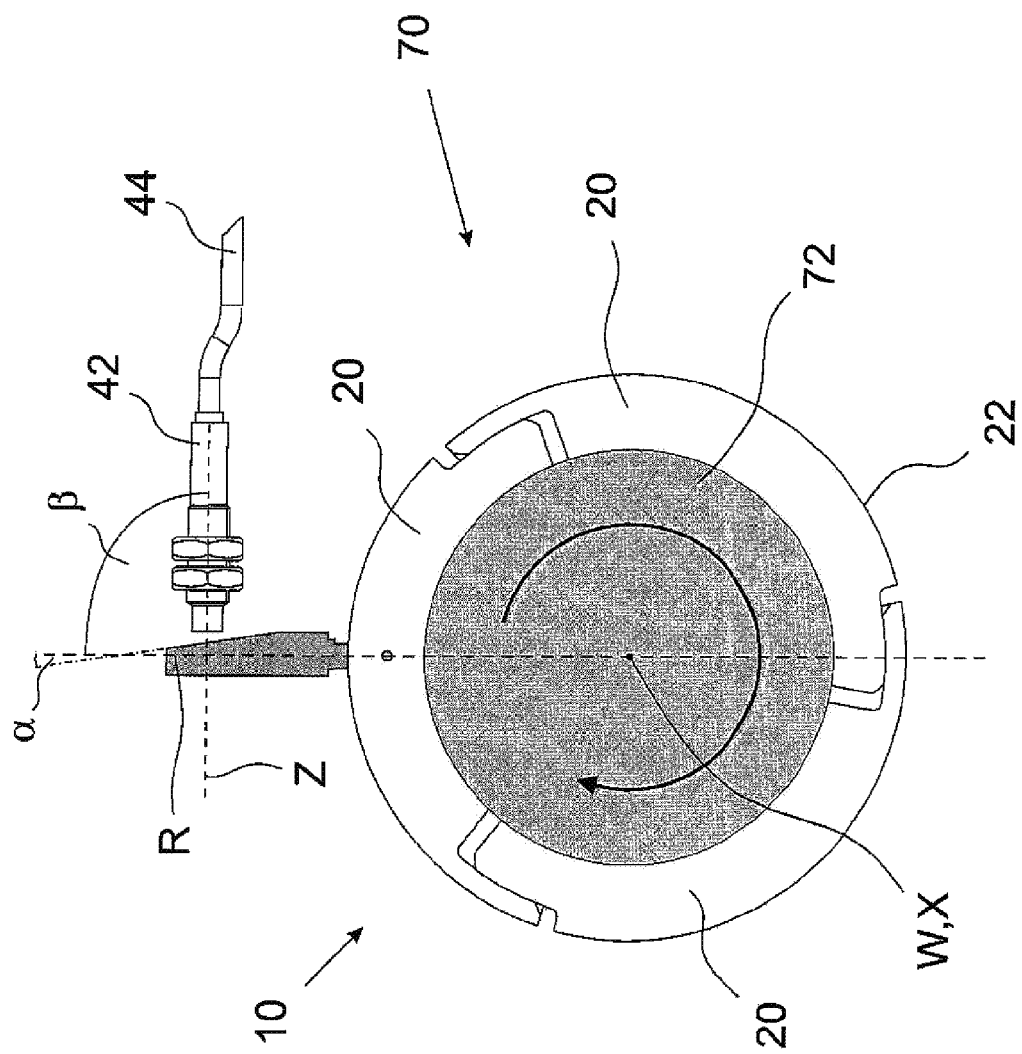

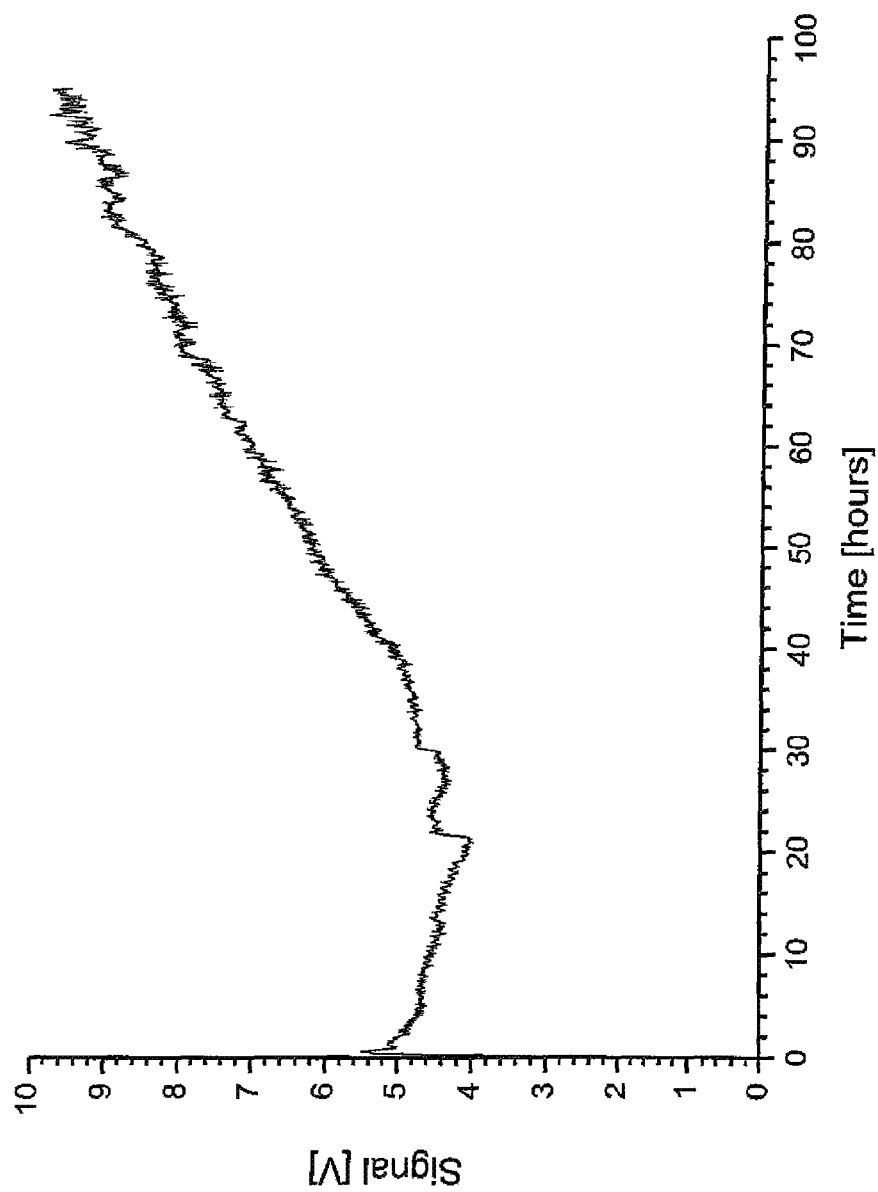

PACKING RING, SEALING DEVICE, COMPRESSOR, ROTATIONAL SYSTEM AND METHOD FOR DETECTING THE CONDITION OF WEAR

FIELD OF THE INVENTION

The present invention relates to a packing ring, a sealing device with at least one packing ring, a compressor with at least one packing ring and/or at least one sealing device, a rotational system with at least one packing ring and/or at least one sealing device and a method for detecting the condition of wear of a packing ring and/or a sealing device.

BACKGROUND OF THE INVENTION

Sealing devices are used in many areas of technology in order to seal off static components or those moving relative to each other. The relative movement may be of an oscillating or rotating nature. Various kinds of sealing devices comprise for example single seals or sealing packs consisting of multiple single seals arranged in succession (also called packing rings). One area of use of sealing devices is compressors.

In compressors, sealing devices are used in various places. The compressor may be part of a larger layout, for example in the chemical industry. One specific application for sealing devices is the sealing of the piston rod of a compressor. In a compressor, the piston rod is sealed in multiple manners, so that as little of the compressed process gases as possible escapes as leakage gas. For the sealing, a piston rod packing is generally used as the sealing device, among others. A piston rod packing comprises multiple single seals arranged one behind the other.

A single seal may be composed of multiple segments, which are respectively formed as circular ring segments. The segments lie against the piston rod by their inner circumferential surfaces and are pressed against the piston rod at their outer circumferential surfaces by a common tube spring, extending in a circle. Such a seal is known for example from DE 10 2006 015 327 A1. The segments consist of polytetrafluoroethylene (PTFE), for example.

In the new condition, the segments arranged around the piston rod do not form a closed circular ring. Instead, gaps (joint clearance) are formed between the segments. Two single seals might become offset relative to each other in immediate succession and regarding the position of their segments so that the gaps of the one single seal are covered by the segments of the second single seal.

When used as intended, material at the inner circumferential surfaces of the segments is gradually worn down by the movement of the piston rod. Thanks to the tube spring, the segments are continuously pressed against the piston rod, so that as the wear progresses the gaps between the segments gradually become smaller. When no more gap remains, the segments no longer lie against the piston rod during further wear and a heavier leakage occurs. In this case, the seal has used up its lifetime.

The lifetime of the packing rings is variable and depends among other things on the process gas, the process pressures and the piston stroke velocity, as well as other parameters. In practice, the lifetime thus far has not been predicted with exactitude. The packing rings are generally designed such that no visual inspection for wear and the associated lifetime is possible during ongoing operation. Oftentimes packing rings are therefore replaced in rotation, even though they have not yet reached the end of their lifetime. Such a procedure is not economical. If packing rings are used for too long a time, total wear and the associated leakage may occur at the end of the lifetime, as described above, which may mean that the entire layout has to be shut down in unscheduled manner and the packing rings need to be replaced. This generally results in large downtime costs.

DE 197 23 804 A1 proposes a device for determining the pressure in the working chamber of a reciprocating piston machine, wherein the pressure is determined indirectly by a strain gauge measurement of a pressure-loaded component. By comparing the pressure against reference values, inferences can then be drawn as to the wear. This procedure is an indirect measurement, not allowing any precise inferences as to the wear. It would be desirable to directly measure the actually occurring wear on individual components.

SUMMARY OF THE INVENTION

Therefore, the problem which the invention proposes to solve is to provide a packing ring in which the current condition of wear can be determined during operation.

This problem is solved by a packing ring for a sealing device, comprising at least two segments that are arranged around a common main axis (X), wherein the packing ring has at least one indicator means that indicates a position of at least one of the segments in a radial direction (R) perpendicular to the main axis (X) of the packing ring, by a sealing device having a housing and at least one packing ring, wherein the packing ring comprises at least two segments that are arranged around a common main axis (X), wherein the sealing device comprises a sensor device which detects a position of at least one of the segments in a radial direction (R) perpendicular to the main axis (X) of the packing ring, by a compressor having a piston rod and having at least one packing ring and/or at least one sealing device, by a rotational system having a shaft rotatable about a shaft axis (W) and at least one packing ring and/or at least one sealing device and by a method for detecting the condition of wear of a packing ring having at least two segments and/or that of a sealing device having such a packing ring with the following steps: arranging a sensor device so that it interacts with a segment and/or an indicator means arranged on a segment; establishing a start position of the segment or the indicator means along a radial direction (R); determining at least one position of the segment or the indicator means along the radial direction (R) of the segment relative to the start position by means of the sensor device.

The packing ring according to the invention for a sealing device comprises at least two segments that are arranged around a common main axis X. The segments preferably have a basic shape of ring segments. Preferably, the packing ring has three segments.

When used as intended, the segments lie directly against an oscillating body, such as a piston rod. Due to the movement of the body, material is worn away from an inner circumferential surface of the segments and the segments gradually wear down.

Packing rings having segments can cancel out the wear for a certain time. For this, the segments in the new condition of the packing ring are arranged spaced apart from each other in the circumferential direction. In this way, gaps are present between the segments. Due to the continuous wear, the width of the segments gradually decreases in the radial direction, so that the segments as a whole begin to move in the radial direction toward the main axis X of the packing ring. The invention takes advantage of this circumstance.

The packing ring is characterized in that it has at least one indicator means that indicates a position of at least one of the segments in a radial direction perpendicular to the main axis of the packing ring.

As described above, the segments gradually move toward the main axis X during their lifetime. Strictly speaking, it is in particular an outer circumferential surface of the segment that moves toward the main axis X. By this movement of the outer circumferential surface is meant in the context of the invention a movement of the segment. Therefore, the indicator means shows in particular the position of the outer circumferential surface or a portion thereof along the radial direction.

By an indicator means is meant in particular a means which allows an observer to discern the position or a change in the position of a segment in the radial direction. The indicator means in particular is a marking on the packing ring or an additional element.

The indicator means preferably comprises at least one indicator pin, which is arranged on a segment. When wear occurs, the indicator pin moves along with the segment gradually toward the oscillating or rotating body, so that the degree of wear of the segment is indicated by the advancement or the change in position of the indicator pin. Especially preferably, the indicator pin is arranged such that it extends away from an outer circumferential surface of the segment in the radial direction R.

In advantageous modifications, it is provided that the indicator pin comprises a slanted surface, wherein the slanted surface makes with the radial direction R an angle $\alpha$, with $\alpha > 0°$. The slanted surface serves preferably for interacting with a sensor element, which shall be further described below. The slanted surface improves the precision of the measurement of the position change of the indicator pin and thus the progress of the wear. Preferably, $\alpha < 20°$.

In preferred embodiments, the indicator pin is joined to the segment. The indicator pin may be connected by material bonding, force locking or form fitting to the segment. Alternatively, the indicator pin may be joined as a single piece to the segment. In a single-piece design, the movement of the segment is mirrored very accurately by the indicator pin, which results in good precision in the measurement of the wear. Especially preferably, the indicator pin is joined in form fit by means of a bolt to the segment. The indicator pin and the segment each have a bore for this purpose, through which a common bolt is inserted and/or press fitted.

Preferably, the packing ring comprises a tube spring, which is arranged in a common groove of the segments such that the tube spring applies a force to the segments in the radial direction R. In this way, the segments are pressed by a common tube spring against the oscillating body. The segments therefore become worn to the same or a similar degree when used as intended.

Advantageously the indicator pin is partly arranged in the groove so that it is held by the tube spring. Preferably, the indicator pin comprises a bore, which is arranged in the groove and receives the tube spring.

The packing ring is preferably used in sealing devices having one or more packing rings and optionally further rings, and especially preferably in compressors, especially as part of a piston rod packing. The further rings include in particular support rings, cover rings and throttle rings. Throttle rings are used to dissipate dynamic force components, and only come into contact with the oscillating piston rod to a slight degree, so that hardly any wear is to be expected here. Even so, a measurement of the wear according to the invention can also be provided for throttle rings.

The same holds for support rings which are only subjected to wear to a secondary degree, since they possess a radial gap from the piston rod at the internal diameter and their primary function is the mechanical bracing of the sealing ring in the direction of the main axis X.

Alternatively or additionally to the combination of cover ring and packing ring, a packing ring can also be used as is known from DE 10 2006 015 327 A1 or AT 505 550 B1. This involves packing rings which are composed of cover and sealing segments, so that no additional cover or sealing ring is required to achieve the sealing function. Throttle and/or support rings can also be used in a piston rod packing when using such packing rings and can be outfitted with a wear measurement according to the invention, but in a preferred embodiment only the wear of the packing ring or the wear of the packing ring contained in the piston rod packing is measured here.

The sealing device according to the invention comprises a housing and at least one packing ring. The packing ring comprises at least two segments that are arranged around a common main axis X.

The sealing device is characterized in that it comprises a sensor device which detects a position of at least one of the segments in a radial direction R perpendicular to the main axis X of the packing ring. In particular, the position of an outer circumferential surface of at least one of the segments is detected in the radial direction.

As already described, the segments move on account of wear in the radial direction R toward the main axis X. The sensor device makes it possible to detect the position of the segment and in this way the condition of wear.

In advantageous modifications, the sealing device comprises at least one packing ring according to the invention as described above.

Advantageously the sensor device interacts with the indicator means and/or the packing ring. In this way, the sensor device can determine the position of a segment and thus its condition of wear. Especially preferably, the sensor device interacts with the outer circumferential surface of at least one segment of the packing ring. Preferably, the sensor device comprises at least one sensor element. Especially preferably, the sensor element is directed at the outer circumferential surface. In this way, the position of the outer circumferential surface and a change in this position is directly detected. In this way, a movement of the outer circumferential surface and thus a movement of the corresponding segment can be detected.

In advantageous modifications, the sensor element is arranged at an angle ß to the radial direction R, where $0° < ß < 90°$. The sensor element is preferably a cylindrical body with a cylinder axis Z or it has a cylindrical base shape with a cylinder axis Z. When the sensor element is arranged at the angle ß, the cylinder axis Z is preferably arranged at the angle ß to the radial direction R. Especially preferably, ß=90°. Thanks to the 90° arrangement, the sensor element is preferably situated parallel to the main axis X. In this way, the sealing device has a compact design, since its extension in the radial direction R is not increased, or only slightly increased.

The sensor element is preferably a distance-measuring sensor element. In particular, the sensor element measures a spacing between itself and the packing ring, especially a segment of the packing ring, and moreover especially an outer circumferential surface of a segment of the packing ring, and/or a spacing between itself and the indicator means, especially the indicator pin. The distance measurement is done preferably in the radial direction R or in a direction parallel to the main axis X of the packing ring.

In advantageous modifications, the sensor element is an eddy current sensor. By a coil of the eddy current sensor, a magnetic field is generated, so that eddy currents are produced in a conductive object which is located in the magnetic field. These eddy currents likewise generate a field which acts in opposition to the magnetic field of the coil. This alteration is detected by the eddy current sensor. The detected signal will differ according to the distance from the conductive object.

Eddy current sensors are small in size and therefore can be easily integrated into a sealing device. Furthermore, eddy current sensors are suited for use in areas with high temperature, high pressure, and contaminants.

In other advantageous modifications, the sensor element is an optical sensor element. An optical sensor element utilizes electromagnetic radiation of at least one wavelength to perform its function.

It is especially advantageous when the optical sensor element is a confocal sensor. In a confocal sensor, a so-called beam path is generated by means of multiple lenses. This breaks down white light into monochromatic light waves. The individual light waves focus at different distances from the lens array. The confocal sensor detects the wavelength of the light wave reflected from an object. In this way, the distance at which the object is located can be determined. Confocal sensors have a resolution of as much as 10 nm. In this way, a high accuracy of the measurement of the degree of wear can be achieved. The lifetime of a packing ring can be better utilized thanks to a high precision.

Advantageously the housing comprises at least two chamber disks, wherein at least one packing ring is situated between two adjacent chamber disks. In addition to at least one packing ring, further rings may also be arranged between the chamber disks and especially between two adjacent chamber disks.

Especially preferably, between two adjacent chamber disks there are arranged in succession a cover ring, a packing ring and a support ring. In one embodiment of the invention, the wear is preferably measured on the cover ring and on the sealing ring, since these rings generally comprise the described all-around joint play between the segments, and the segments are in this way moved up in the radial direction R toward the main axis X when wear occurs at the internal diameter.

In advantageous modifications, at least one chamber disk comprises a slot for an indicator pin of a packing ring. A slot is advisable, in particular, when the indicator pin extends away from the packing ring in the radial direction. In this instance, the providing of a slot prevents the chamber disk from having to be enlarged overall.

It is especially advantageous when the indicator pin is led in the slot. This ensures that the indicator pin can only move in a desired direction. A movement in the axial direction of the sealing device and/or in the circumferential direction is preferably prevented. The slot is preferably situated with a radial spacing from the packing ring.

Advantageously at least one chamber disk comprises a bore for the slot of a sensor element and/or a sensor line. There may also be a common bore provided in multiple adjacent chamber disks. The bore in particular makes it possible to position the sensor element close to the packing ring and/or the indicator means. In this way, a precise measurement is ensured, especially in connection with a confocal sensor.

The sensor element is preferably arranged by means of a screw connection in and/or on a chamber disk. Especially preferably, the sensor element has an external thread and is screwed into a chamber disk.

In this way, it is ensured that no relative movement occurs between sensor element and chamber disk. This enhances the precision of the measurement.

In order to ensure that the additionally provided bore does not reduce the sealing ability of the sealing device, in advantageous modifications it is provided that at least one sealing element is situated between the chamber disks in the area of the bore.

In advantageous modifications, at least one chamber disk comprises a viewing element. A viewing element is transparent in at least one wavelength region and especially in the region of visible light (380 nm to 780 nm). The viewing element consists preferably of quartz glass. The viewing element enables a viewing of the packing ring and/or the indicator means from outside the interior space in which the packing ring is situated. In particular, a sensor element may be arranged such that the viewing element is situated between sensor and packing ring. In this way, the sensor element is not exposed, or only slightly exposed, to the conditions in the interior of the housing. The sensor element is then preferably a confocal sensor.

A compressor according to the invention comprises a piston rod and at least one packing ring according to the above remarks and/or at least one sealing device according to the above remarks. The compressor according to the invention is used preferably for the compressing of gases, especially process gases in industrial layouts.

A rotational system according to the invention has a shaft rotatable about a shaft axis W and at least one packing ring according to the above remarks and/or at least one sealing device according to the above remarks. The packing ring is arranged on the shaft and sealed for example at a transition from a lubricated to a non-lubricated region. The rotational system according to the invention is preferably used in blowers, fans or pumps.

The method according to the invention for detecting the condition of wear of a packing ring having at least two segments and/or that of a sealing device having such a packing ring involves the following steps: arranging a sensor device so that it interacts with a segment and/or an indicator means arranged on a segment; establishing a start position of the segment or the indicator means along a radial direction R; determining at least one position of the segment or the indicator means along the radial direction R of the segment relative to the start position by means of the sensor device.

As already described, the position of a segment is changed in that it gradually becomes worn down at an inner circumferential surface. Thanks to the method according to the invention, the position of a segment relative to a start position is determined directly or indirectly. The determined position gives insight into how heavily the segment and, with the segment, the packing ring is worn down.

In advantageous modifications, the position of the segment or the indicator device is plotted as a function against time. This function enables a continuous monitoring of the condition of wear of the packing ring.

Advantageously at the beginning of the method an end value for the position of the segment or the indicator means is established, the position so determined is compared to the end value, and a warning is given upon reaching or surpassing the end value. The end value establishes when a packing ring is considered to be worn, i.e., when the packing ring has reached the end of its lifetime.

The end value may be set at a portion of the value for the lifetime, for example 80%. In this way, a safety margin will remain.

In advantageous modifications, the determination of the position of the segment or the indicator means is done by a distance measurement. A distance measurement is advantageous, since distance measurements can be done with little expense and the measurement apparatus for the distance measurement is robust. The distance measurement is done preferably between sensor element and indicator means and/or between sensor element and a segment of the packing ring, especially an outer circumferential surface of the segment.

Advantageously the determination of the position of the segment or the indicator means is done by an optical measurement or a measurement using eddy current. An optical measurement utilizes electromagnetic radiation of at least one wavelength to perform the measurement. Nonconductive materials can also be measured in an optical measurement.

BRIEF DESCRIPTION OF THE DRAWINGS

The invention shall be explained and represented as an example below, with the aid of the drawings. There are shown:

FIG. 9, a rotational system according to the invention;

FIG. 10, a diagram of a wear measurement.

DETAILED DESCRIPTION OF THE INVENTION

Figure 1:
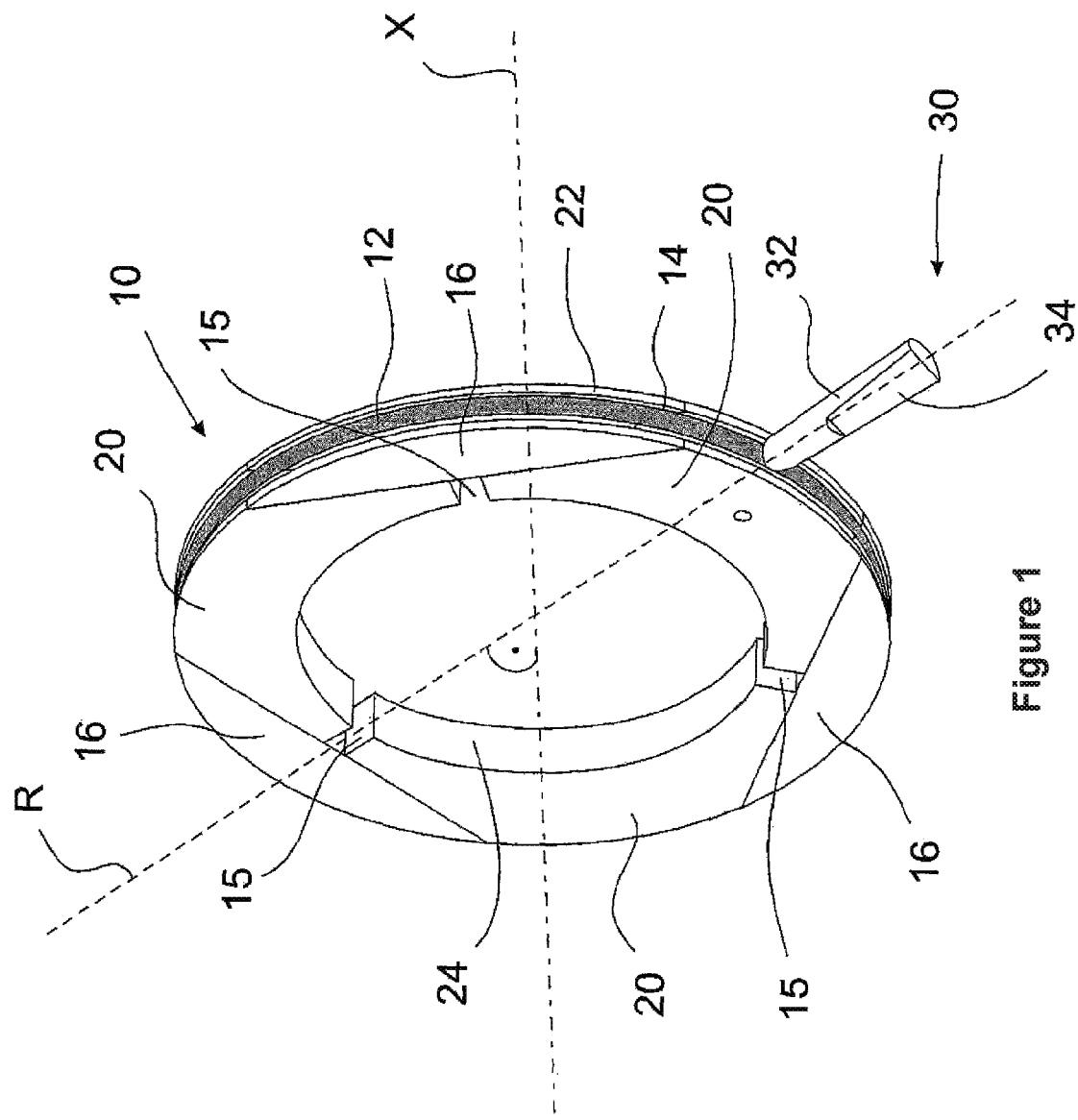
FIG. 1, a first embodiment of a packing ring according to the invention in a perspective view.

FIG. 1 shows a packing ring 10 with three segments 20. The three segments 20 have a common inner circumferential surface 24. When used as intended, the segments 20 lie by the inner circumferential surface 24 for example against a piston rod (not shown here) and seal it off there. The segments 20 are arranged about a common main axis X.

Between every two adjacent segments 20 there is provided a gap 15 in the circumferential direction. When used as intended, the segments 20 wear down in the area of the inner circumferential surface 24. As a result, the segments 20 gradually move toward the main axis X. Thanks to this movement, the gaps 15 gradually become smaller, until the segments 20 lie directly against each other. The segments 20 then cannot move further in the direction of the main axis X, so that upon further wear at the inner circumferential surface 24 the packing ring 10 becomes leaky there.

In order to enable complete tightness, two packing rings 10 can be arranged in succession in the direction of the main axis X. The packing rings 10 will be twisted relative to each other in the circumferential direction so that each gap 15 of a packing ring 10 is covered over by the segment 20 of the other respective packing ring 10.

The packing ring 10 has three support elements 16. The support elements 16 and the segments 20 are arranged alternating in the circumferential direction of the packing ring 10. The support elements 16 have a common outer circumferential surface 22 with the segments 20. The outer circumferential surface 22 has the form of an envelope surface of a cylinder.

In the area of the outer circumferential surface 22 there is provided a groove 14. The groove 14 extends in the circumferential direction over the entire outer circumferential surface 22. A tube spring 12 is arranged in the groove 14. The tube spring 12 produces a force directed at the main axis X. In this way, the segments 20 when used as intended are pressed against the piston rod (not shown). The tube spring 12 is represented schematically in all the figures.

The packing ring 10 comprises an indicator means 30 in the form of an indicator pin 32. The indicator pin 32 is arranged in the area of the outer circumferential surface 22 on a segment 20. The indicator pin 32 is of cylindrical base shape and has a slanted surface 34. The indicator pin 34 is situated such that the longitudinal axis of the cylindrical base shape extends in the radial direction R. The radial direction R forms a right angle with the main axis X.

Figure 2:
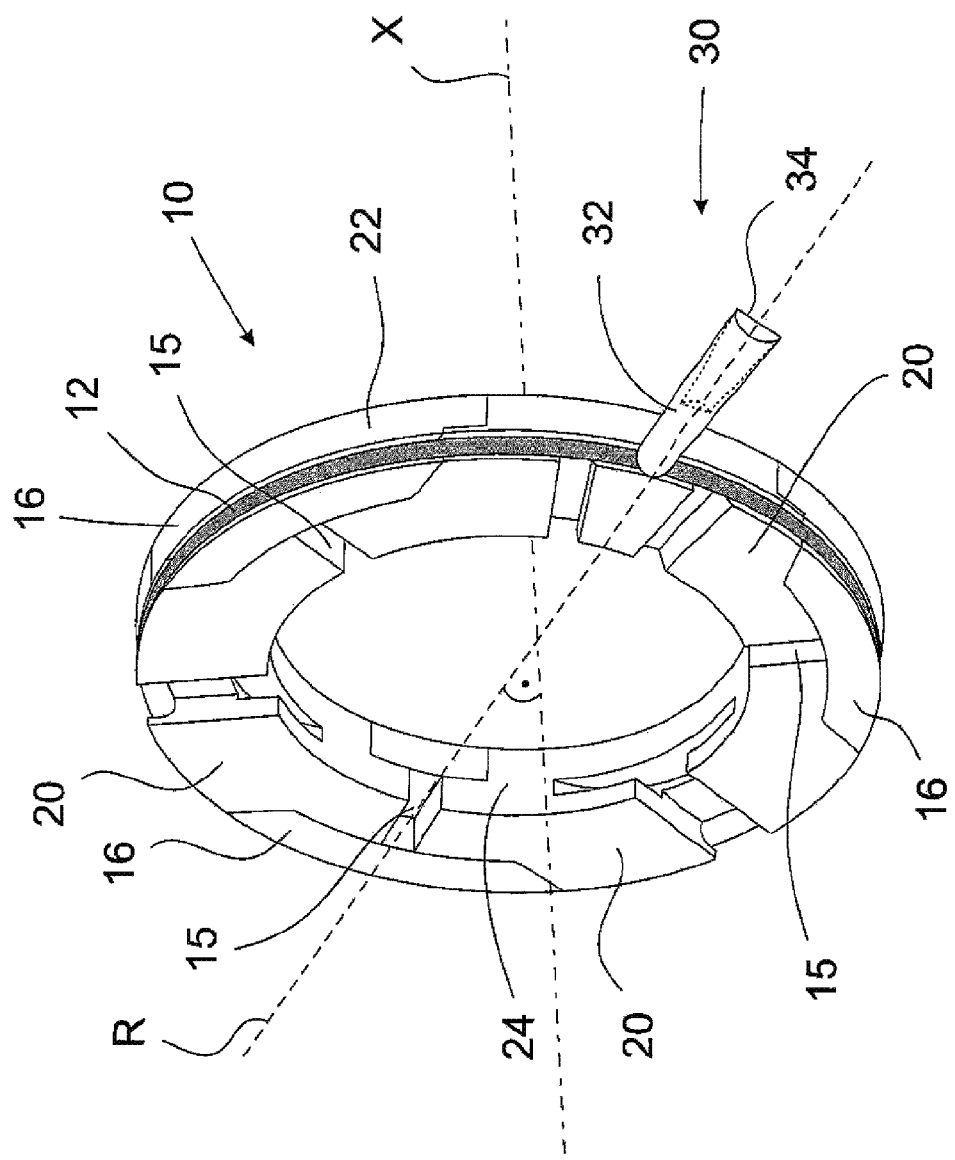
FIG. 2, a second embodiment of a packing ring according to the invention in a perspective view.
Figure 3:
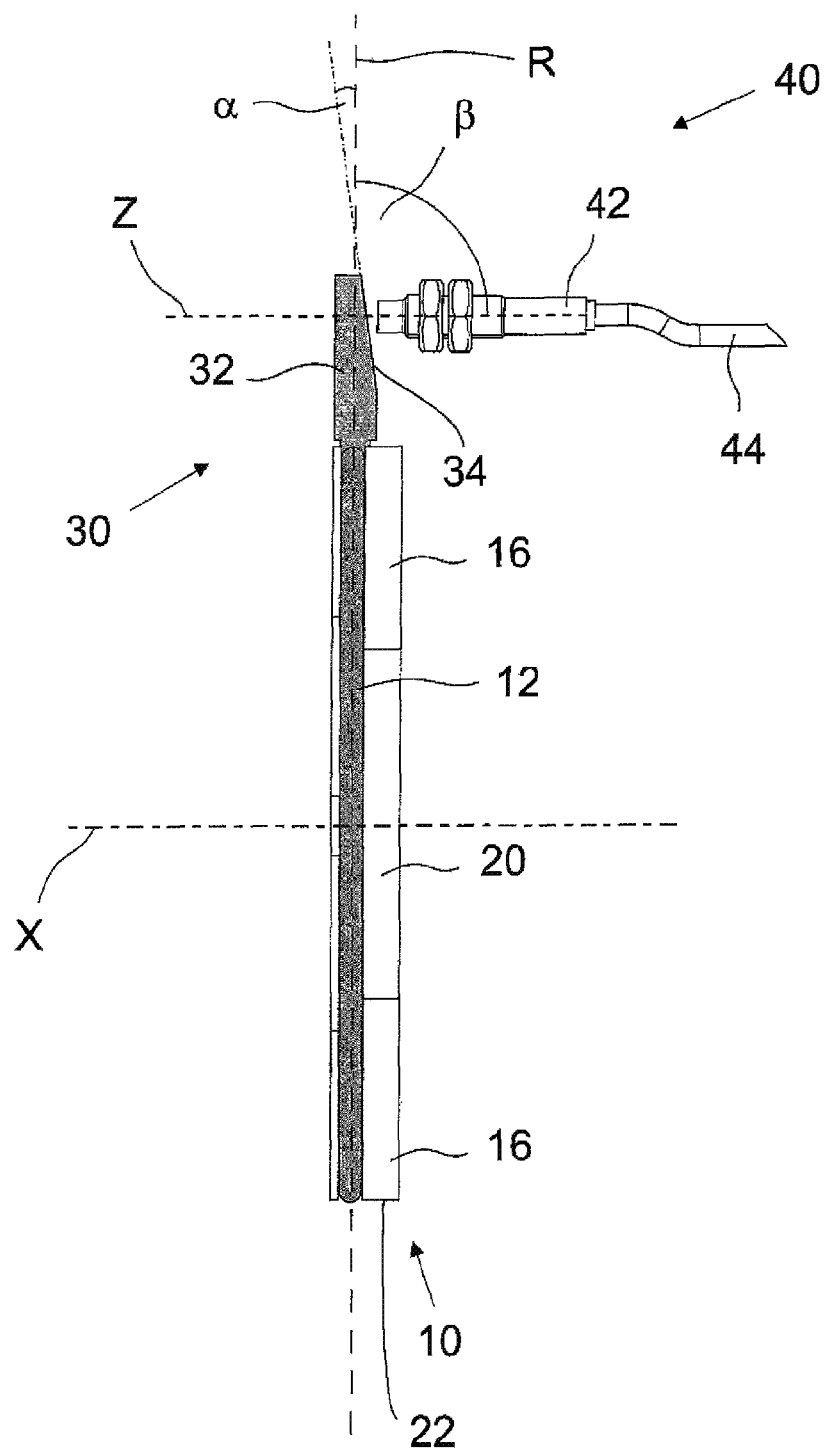
FIG. 3, a side view of the packing ring of FIG. 2 with a sensor element.

FIGS. 2 and 3 show a packing ring 10 according to a second embodiment. Compared to the embodiment of FIG. 1, the segments 20 and the support elements 16 differ in their shape. The invention can be applied to many different known packing rings 10.

FIG. 3 shows in addition a sensor element 42 with a cylinder axis Z. The cylinder axis Z is parallel to the main axis X of the packing ring 10. The sensor element 42 is oriented to the slanted surface 34 of the indicator pin 32. The slanted surface 34 is situated at an angle α to a radial direction R. The angle α is around 7°. The cylinder axis Z is situated at an angle ß to the radial direction R. The angle ß amounts to 90°.

The sensor element 42 determines its distance from the slanted surface 34 of the indicator pin 32. With increasing wear, the segments 20 move toward the main axis X. The indicator pin 32 is connected to a segment 20. Therefore, the indicator pin 32 also moves due to wear toward the main axis X. In this way, the distance between sensor element 42 and slanted surface 34 gradually increases, while in particular the distance along the cylinder axis Z is measured. The continuous increasing of the distance is detected by the sensor element 42 and can be indicated and/or processed on an evaluation device (not shown here). The sensor element is connected by means of a sensor line 44 to the evaluation device.

Figure 4:
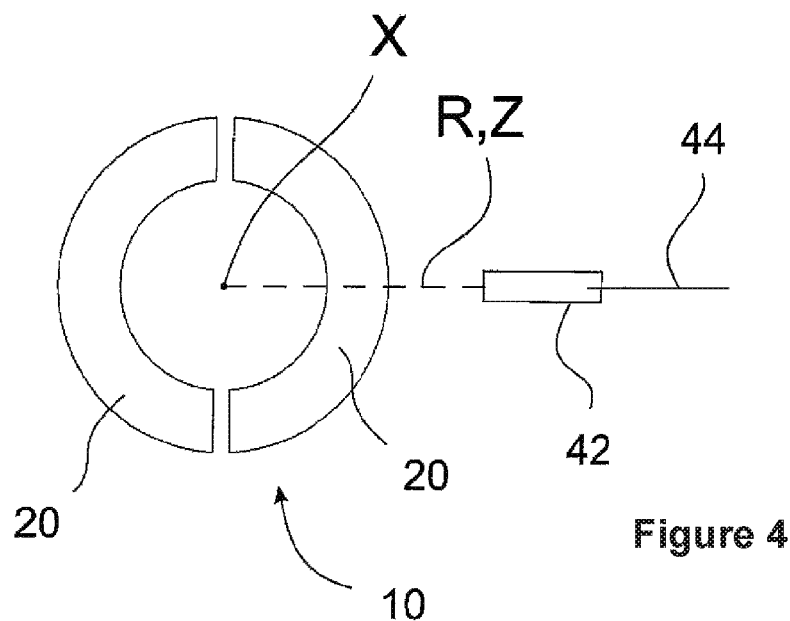
FIG. 4, an embodiment of a packing ring with a sensor element in a schematic view.

FIG. 4 shows schematically a packing ring 10 with two segments 20. The segments 20 are designed as half-shells and are situated about a common main axis X. A sensor element 42 with a cylinder axis Z is oriented toward one of the segments 20. The sensor element 42 is a cylindrical body. The packing ring 10 represented in FIG. 4 with the sensor element 42 is part of a sealing device according to the invention, not fully represented in FIG. 4.

The cylinder axis Z corresponds to the radial axis R. The angle ß between the cylinder axis Z and the radial direction R in this arrangement amounts to 0°.

At the sensor element 42 there is arranged a sensor line 44. The sensor line 44 leads to an evaluation device (not shown here). The sensor element 42 in the embodiment shown is an eddy current sensor, i.e., a distance-measuring sensor element 42. When used as intended, the sensor element 42 continuously detects the distance between sensor element 42 and segment 20. Owing to wear, the segments 20 move in the direction of the main axis X, so that the distance between sensor element 42 and segment 20 increases. The wear can be determined from the distance.

Figure 5:
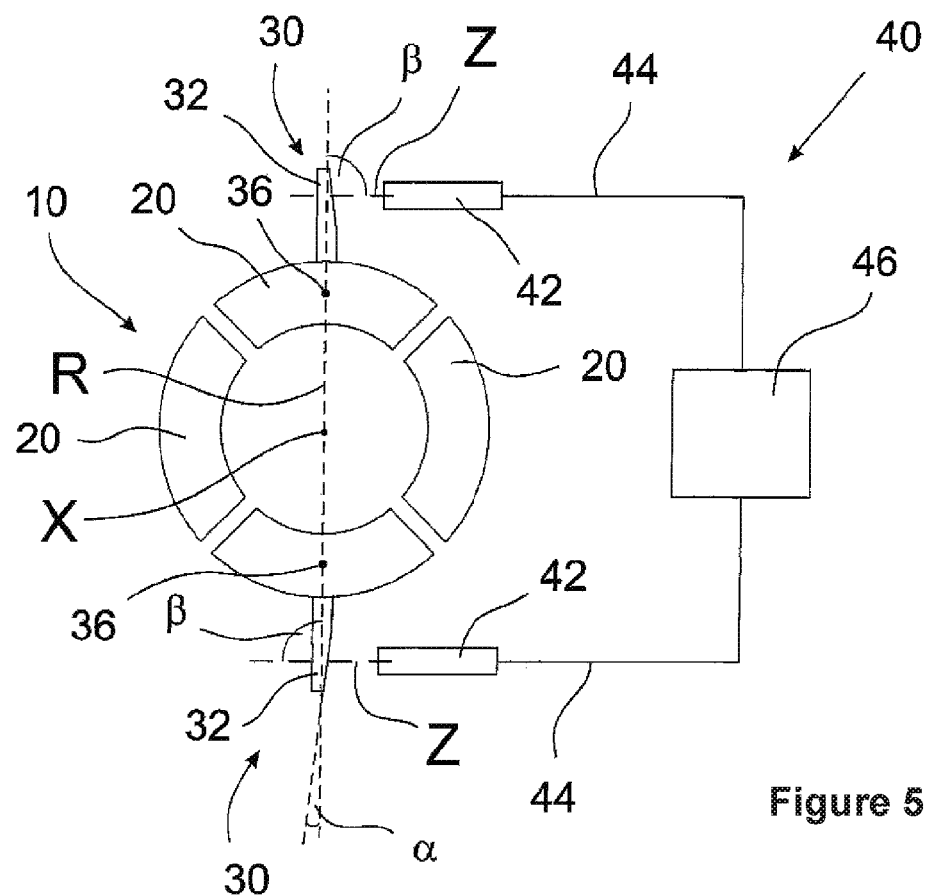
FIG. 5, a further embodiment of a packing ring according to the invention with a sensor device in a schematic view.

FIG. 5 shows a further embodiment of a packing ring 10. The packing ring 10 has four segments 20, which are arranged about a common main axis X. On each of two opposite segments 20 is arranged an indicator pin 32. The indicator pins 32 extend in a common radial direction R. Each indicator pin 32 is fastened by a respective bolt 36 in form fitting manner to a segment 20.

The indicator pins 32 each have a slanted surface 34. The slanted surfaces 34 are respectively situated at an angle α to the radial direction R. In the embodiment shown, α~7°.

A sensor device 40 comprises two sensor elements 42. One sensor element 42 is associated respectively with an indicator pin 32. The sensor elements 42 each have a cylindrical shape with a cylinder axis Z. The cylinder axes Z are each situated at an angle ß to the radial direction R. In the embodiment shown, ß=90°.

The sensor elements 42 are respectively attached across a sensor line 44 to an evaluation device 46. The evaluation device 46 receives the signals of the sensor elements 42 and displays them to a user. In addition, an end value for the position of the indicator pins 32 is set in memory in the evaluation device 46. If this end value is surpassed for one of the two indicator pins 32, a warning is given through the evaluation device 46.

Figure 6:
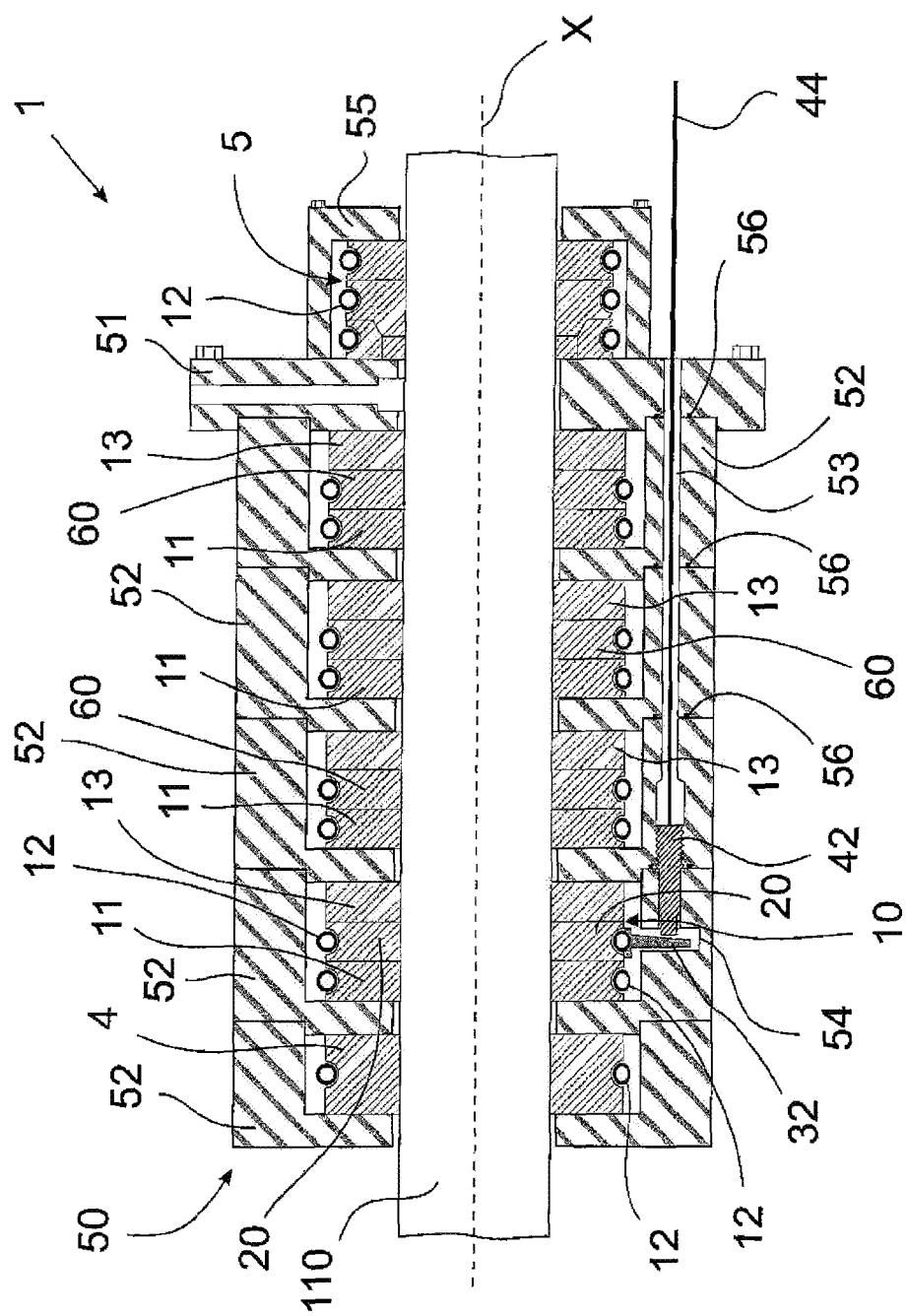
FIG. 6, a first embodiment of a sealing device according to the invention in a schematic view.

FIG. 6 shows a sealing device 1 with a housing 50 and a packing ring 10 according to the invention arranged in the housing 50. The sealing device 1 is a piston rod packing for the sealing of a piston rod 110. In the housing 50, furthermore, three additional packing rings 60 are arranged. The packing ring 10 has a plurality of segments 20, which are arranged around a common main axis X.

The housing 50 comprises five chamber disks 52. All the packing rings 10, 60 are arranged respectively between a cover ring 11 and a support ring 13. Each chamber disk 52 comprises an inner space in which either a packing ring 10, 60 with the corresponding cover ring 11 and support ring 13 or a throttle ring 4 is arranged. A chamber disk 52 is arranged on a first side of a flange 51. On a second side of the flange 51 opposite the first side is arranged a top piece 55, in which a leakage gas seal 5 is arranged.

The packing rings 10, 60, the throttle ring 4, the cover rings 11 and individual rings of the leakage gas seal 5 are each subjected to force by a tube spring 12 directed at the main axis X. In this way, these rings thrust against the piston rod 110.

The packing ring 10 comprises an indicator pin 32, The chamber disk 52 of the packing ring 10 comprises a slot 54 for the indicator pin 32. The indicator pin 32 has a slanted surface 34. Due to the wear of the segments 20 of the packing ring 10, the indicator pin 32 moves in the slot 54 toward the main axis X. A sensor element 42 is directed at the slanted surface 34 of the indicator pin 32. The sensor element 42 continuously ascertains the distance from the slanted surface 34. The sensor element 42 is screwed into a chamber disk 52. The sensor element 42 is an eddy current sensor. The sensor element 42 is connected by means of the sensor line 44 to an evaluation device (not shown here).

Four chamber disks 52 and the flange 51 have a common bore 53 for the sensor element 42 and sensor line 44. In the area of the bore 53, a sealing element 56 is arranged between every two chamber disks 52 or a chamber disk 52 and the flange 51. The sealing elements 56 prevent leakiness from being caused by the bore 53.

Figure 7:
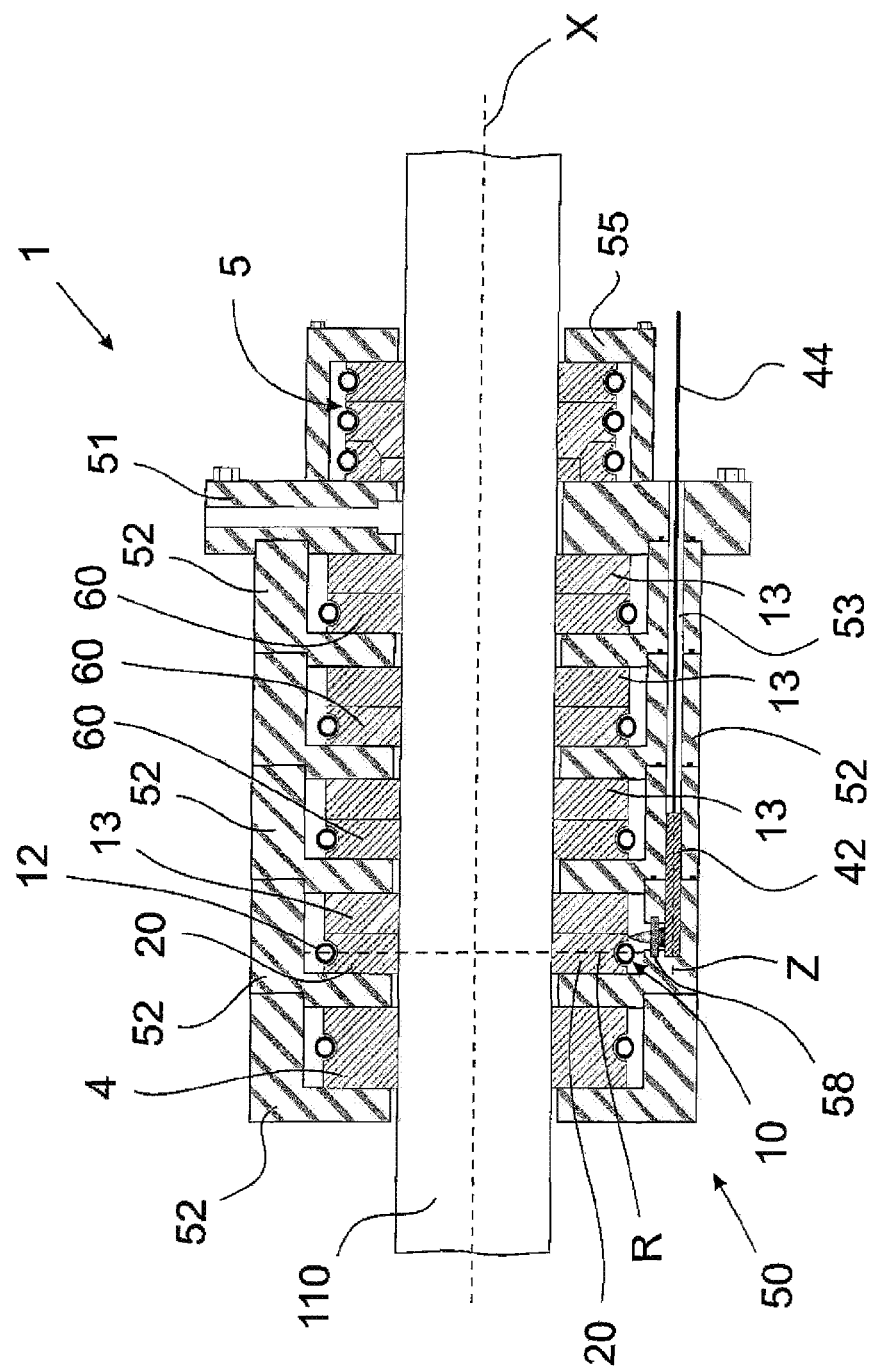
FIG. 7, a second embodiment of a sealing device according to the invention in a schematic view.

FIG. 7 shows a further embodiment of a sealing device 1 according to the invention. The sealing device 1 comprises a housing 50 with five chamber disks 52, a flange 51 and a top piece 55, through which a piston rod 110 extends.

The chamber disks 52 respectively have an inner space, in which either a packing ring 10, 60 together with a support ring 13 or a throttle ring 4 is located. The packing rings 10, 60 are of traditional design. In the interior of the top piece 55 there is arranged a leakage gas seal 5.

The sealing device 1 comprises an optical sensor element 42 in the form of a confocal sensor. The chamber disk 52 of the packing ring 10 comprises a viewing element 58 radially outside the packing ring 10. The viewing element 58 in the embodiment shown is a disk of quartz glass. The sensor element 42 is arranged radially outside the viewing element 58. The viewing element 58 is located between the packing ring 10 and the sensor element 42.

The packing ring 10 comprises a plurality of segments 20 which are arranged about a common main axis X. The confocal sensor has a cylindrical base shape. It is built in a 90° design. In this design, the measuring direction is perpendicular to a cylinder axis Z of the cylindrical base shape. The cylinder axis Z is arranged parallel to the main axis X. The measuring direction of the sensor element 42 is thus parallel to a radial direction R of the packing ring 10.

The sensor element 42 generates a beam path by means of which the distance between the sensor element 42 and a segment 20 of the packing ring 10 is determined. If the segment 20 moves on account of wear toward the main axis X, the distance will become greater. In this way, the wear on the segment 20 can be determined.

Figure 8:
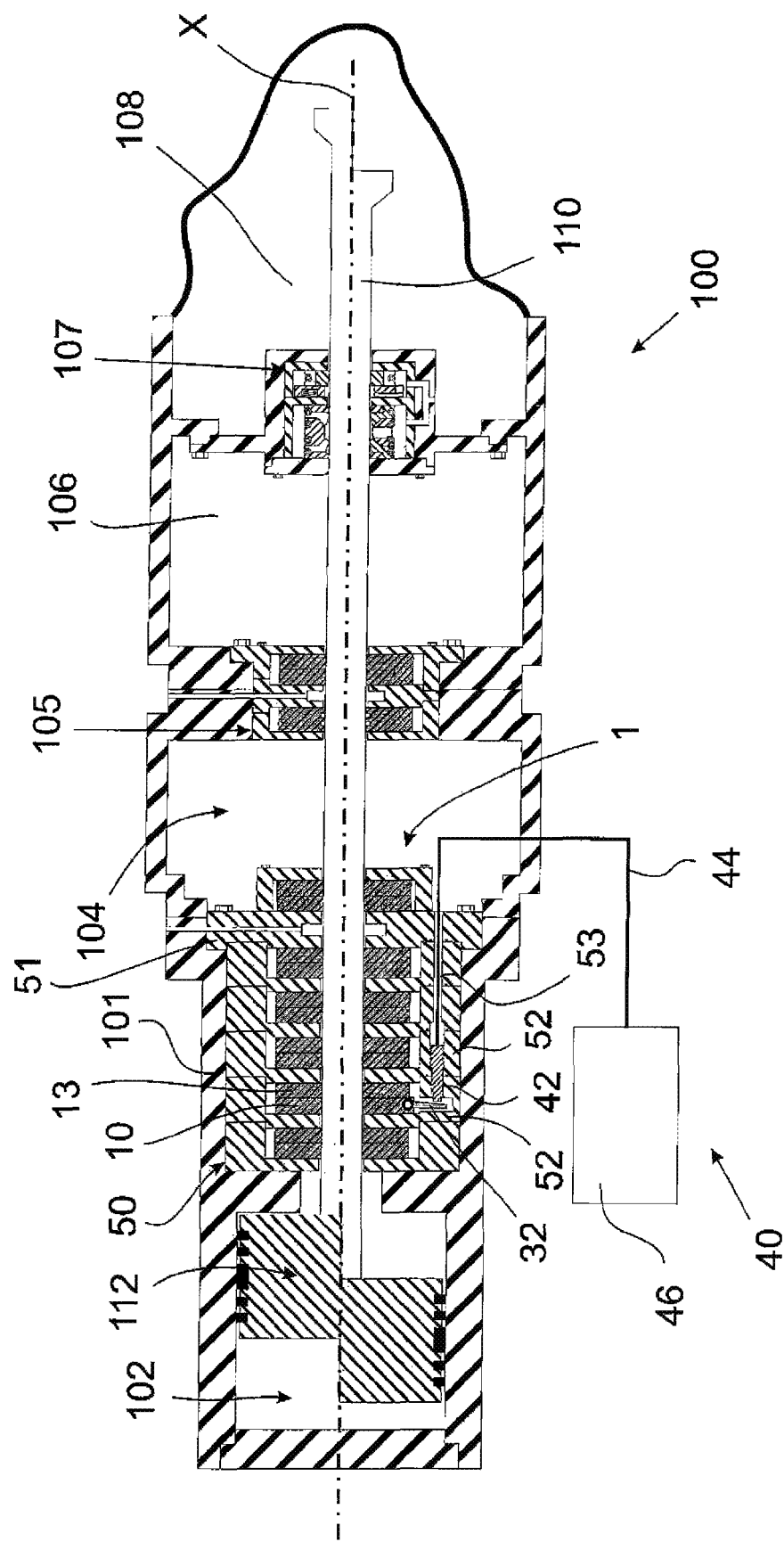
FIG. 8, a compressor according to the invention.

The sensor element 42 is attached by means of the sensor line 44 to an evaluation device (not shown here), FIG. 8 shows a compressor 100 according to the invention with a sealing device 1. The compressor 100 comprises a compressor housing 101, in which a piston rod 110 is arranged. The piston rod 110 when used as intended executes an oscillating movement and is driven by a crank (not shown).

The compressor 100 comprises a compression chamber 102, in which process gas can be compressed. In the compression chamber 102 there is arranged a piston 112. The piston 112 is connected to the piston rod 110. Starting from the compression chamber 102, the compressor 100 comprises along the main axis X a first intermediate piece 104, a second intermediate piece 106 and a crankcase 108. The piston rod 110 extends from the compression chamber 102 as far as the crankcase 108.

The piston rod 110 and piston 112 are represented in two states. In a first state, the piston 112 is situated at a first turning point. At a turning point the velocity of the piston is equal to zero. In the first state, the process gas occupies the greatest possible volume in the compression chamber 102. In a second state, the piston 112 is situated at a second turning point. In the second state, the process gas has been compressed and occupies a lesser volume. Not shown in FIG. 8 are an inlet and an outlet for the process gas.

Between the compression chamber 102 and the first intermediate piece 104 is situated the sealing device 1. The sealing device 1 is designed as a piston rod packing. The sealing device 1 comprises a housing 50, in which a packing ring 10 is arranged. The packing ring 10 comprises an indicator pin 32, which extends radially outward from the packing ring 10. The packing ring 10 is arranged together with a support ring 13 between two chamber disks 52 of the housing 50.

The compressor 100 comprises a sensor device 40. The sensor device has a sensor element 42, a sensor line 44 and an evaluation device 46. The sensor element 42 is arranged in the housing 50. The sensor line 44 connects the sensor element 42 to the evaluation device 46. The sensor element 42 in the embodiment shown is an eddy current sensor. The housing 50 comprises a bore 53 for the sensor element 42 and a portion of the sensor line 44.

Between the first intermediate piece 104 and the second intermediate piece 106 there is arranged an intermediate seal 105. The intermediate seal 105 is an additional safeguard and prevents the process gas which has gotten into the first intermediate piece 104 despite the sealing device 1 from getting into the second intermediate piece 106. Between the second intermediate piece 106 and the crankcase 108 is arranged an oil wiper seal 107. The oil wiper seal 107 makes sure that the least possible lubricant, especially oil, gets from the crankcase 108 into the second intermediate piece 106.

FIG. 9 shows a rotational system 70 according to the invention. The rotational system 70 comprises a shaft 72 with a shaft axis W, The shaft 72 is rotatably mounted about the shaft axis W. On the shaft 72 is arranged a packing ring 10.

The packing ring 10 comprises three segments 20. The segments 20 are arranged about a common main axis X, which in the embodiment shown corresponds to the shaft axis W. On one segment 20 there is mounted an indicator pin 32. The indicator pin 32 extends in the radial direction R away from the segment 20. A sensor element 42 with a cylinder axis Z is directed at the indicator pin 32.

Optional components of the rotational system 70, not shown, include a housing, a bearing for the shaft, and a drive mechanism.

FIG. 10 shows a diagram of a wear measurement. On the ordinate axis is plotted the time of the measurement, in hours. On the abscissa axis is plotted the signal strength of the sensor element in Volts.

One can see the signal of an eddy current sensor, which is directed at the slanted surface of the indicator pin, mounted on a segment. The segment is part of a packing ring in a piston rod seal of a piston compressor. The material used for the segments was a quick-wearing PTFE in order to minimize as much as possible the time of the experiment until total wear of the sealing ring. The packing ring seals off a dynamic pressure of 30 bar to 80 bar. The medium being sealed off was nitrogen.

One notices that at the start of the experiment the system is running in for the first 36 h and an initial value of 5 V is maintained. During this time, pressure and temperature are adjusted to the final steady state.

After this run-in phase there is found a continuous rise in the signal. This rise reflects the continuous wearing of the segment with which the sensor element is associated. Transient fluctuations ("trembling") are attributed to pressure fluctuations and the movement of the piston rod. At around 95 h, the value of almost 10 V is reached, which corresponds to a wear of 100%. At the time, the segments of the packing ring are lying against each other, so that the lifetime was used up.

Thus, for comparable packing rings, an end value of 9 V could be indicated. At this end value, an evaluation device could put out a warning signal.

LIST OF REFERENCE NUMBERS

1 Sealing device
4 Throttle ring
5 Leakage gas seal
10 Packing ring
11 Cover ring
12 Tube spring
13 Support ring
14 Groove
15 Gap
16 Support element
20 Segment
22 Outer circumferential surface
24 Inner circumferential surface
30 Indicator means
32 Indicator pin
34 Slanted surface
36 Bolt
40 Sensor device
42 Sensor element
44 Sensor line
46 Evaluation device
50 Housing
51 Flange
52 Chamber disk
53 Bore
54 Slot
55 Top piece
56 Sealing element
58 Viewing element
60 Additional packing ring
70 Rotational system
72 Shaft
100 Compressor
101 Compressor housing
102 Compression chamber
104 First intermediate piece
105 Intermediate seal
106 Second Intermediate piece
107 Oil wiper seal
108 Crankcase
110 Piston rod
112 Piston
R Radial direction
W Shaft axis
X Main axis
Z Cylinder axis
α Angle
ß Angle

What is claimed is:

1. A packing ring for a sealing device for a rotating or oscillating body, comprising:
   at least two segments that are arranged around a common main axis (X),
   wherein each segment at least has an outer circumferential surface, an inner circumferential surface, and two axial end surfaces,
   wherein the outer circumferential surface and the inner circumferential surface each extend essentially around the main axis (X),
   wherein the axial end surfaces each extend essentially perpendicular to the main axis (X),
   wherein the at least two segments are spaced apart from each other in a circumferential direction such that an outer circumferential surface of each segment moves toward the main axis (X) when wear occurs at an inner circumferential surface of the segments,
   wherein the outer circumferential surface has the form of a part of an envelope surface of a cylinder, wherein the packing ring has at least one indicator means that indicates a position of the outer circumferential surface of at least one of the segments or a portion thereof in a radial direction (R) perpendicular to the main axis (X) of the packing ring, with the indicator means having a longitudinal axis extending in the radial direction (R), wherein the indicator means comprises at least one indicator pin, which is arranged on one of the at least two segments such that the indicator pin moves towards the main axis (X) along with the segment when the wear occurs, wherein the at least one indicator pin is arranged such that it extends away from the outer circumferential surface of the segment in the radial direction (R), wherein the packing ring comprises a tube spring, which is arranged in a common groove of the segments such that the tube spring applies a force to the segments in the radial direction (R), and wherein the at least one indicator pin is partly arranged in the groove so that it is held by the tube spring.

2. The packing ring according to claim 1, wherein the at least one indicator pin comprises a slanted surface, wherein the slanted surface makes with the radial direction (R) an angle ($\alpha$), with $\alpha>0°$.

3. The packing ring according to claim 2, wherein $\alpha<20°$.

4. The packing ring according to claim 1, wherein the at least one indicator pin is joined to the segment.

5. A sealing device, comprising:
a housing;
at least one packing ring, comprising: at least two segments that are arranged around a common main axis (X)

wherein each segment at least has an outer circumferential surface, an inner circumferential surface, and two axial end surfaces, wherein the outer circumferential surface and the inner circumferential surface each extend essentially around the main axis (X), wherein the axial end surfaces each extend essentially perpendicular to the main axis (X), wherein the at least two segments are spaced apart from each other in a circumferential direction such that an outer circumferential surface of each segment moves toward the main axis (X) when wear occurs at an inner circumferential surface of the segments, wherein the outer circumferential surface has the form of a part of an envelope surface of a cylinder, wherein the packing ring has at least one indicator means that indicates a position of the outer circumferential surface of at least one of the segments or a portion thereof in a radial direction (R) perpendicular to the main axis (X) of the packing ring, with the indicator means having a longitudinal axis extending in the radial direction (R), wherein the indicator means comprises at least one indicator pin, which is arranged on one of the at least two segments such that the indicator pin moves towards the main axis (X) along with the segment when the wear occurs, wherein the at least one indicator pin is arranged such that it extends away from the outer circumferential surface of the segment in the radial direction (R), wherein the packing ring comprises a tube spring, which is arranged in a common groove of the segments such that the tube spring applies a force to the segments in the radial direction (R), wherein the at least one indicator pin is partly arranged in the groove so that it is held by the tube spring; and a sensor device which detects a position of at least one of the at least one indicator pin in a radial direction (R) perpendicular to the main axis (X) of the packing ring.

6. The sealing device according to claim 5, wherein the sensor device interacts with the at least one indicator pin.

7. The sealing device according to claim 5, wherein the sensor device comprises at least one sensor element.

8. The sealing device according to claim 7, wherein the at least one sensor element is arranged at an angle ($\beta$) to the radial direction (R), where $0°<\beta<90°$.

9. The sealing device according to claim 7, wherein the at least one sensor element is a distance-measuring sensor element.

10. The sealing device according to claim 7, wherein the at least one sensor element is an eddy current sensor.

11. The sealing device according to claim 7, wherein the at least one sensor element is an optical sensor element.

12. The sealing device according to claim 11, wherein the optical sensor element is a confocal sensor.

13. The sealing device according to claim 5, wherein the housing comprises at least two chamber disks, wherein at least one packing ring is situated between two adjacent chamber disks.

14. The sealing device according to claim 13, wherein at least one of the at least two chamber disks comprises a slot for the indicator pin of the at least one packing ring.

15. The sealing device according to claim 14, wherein the indicator pin is led in the slot.

16. The sealing device according to claim 15, wherein the slot is situated with a radial spacing from the packing ring.

17. The sealing device according to claim 15, wherein the at least one chamber disk comprises a bore for the slot of a sensor element and/or a sensor line.

18. The sealing device according to claim 17, wherein at least one sealing element is situated between the at least two chamber disks in the area of the bore.

19. The sealing device according to claim 13, wherein the at least one chamber disk comprises a viewing element.

20. The sealing device according to claim 19, wherein the viewing element consists of quartz glass.

21. A compressor comprising: a piston rod;
at least one packing ring, comprising:
at least two segments that are arranged around a common main axis (X), wherein each segment at least has an outer circumferential surface, an inner circumferential surface, and two axial end surfaces, wherein the outer circumferential surface and the inner circumferential surface each extend essentially around the main axis (X), wherein the axial end surfaces each extend essentially perpendicular to the main axis (X), wherein the at least two segments are spaced apart from each other in a circumferential direction such that an outer circumferential surface of each segment moves toward the main axis (X) when wear occurs at an inner circumferential surface of the segments, wherein the outer circumferential surface has the form of a part of an envelope surface of a cylinder, wherein the packing ring has at least one indicator means that indicates a position of the outer circumferential surface of at least one of the segments or a portion thereof in a radial direction (R) perpendicular to the main axis (X) of the packing ring, with the indicator means having a longitudinal axis extending in the radial direction (R), wherein the indicator means comprises at least one indicator pin, which is arranged on one of the at least two segments such that the indicator pin moves towards the main axis (X) along with the segment when the wear occurs, wherein the at least one indicator pin is arranged such that it extends away from the outer circumferential surface of the segment in the radial direction (R), wherein the packing ring comprises a tube spring, which is arranged in a common groove of the segments such that the tube spring applies a force to the segments in the radial direction (R), and wherein the at least one indicator pin is partly arranged in the groove so that it is held by the tube spring, and at least one sealing device that comprises a sensor device which detects a position of the at least one indicator pin in a radial direction (R) perpendicular to the main axis (X) of the packing ring.

22. A rotational system, comprising:

a shaft rotatable about a shaft axis (W);

at least one packing ring, comprising:

at least two segments that are arranged around a common main axis (X), wherein each segment at least has an outer circumferential surface, an inner circumferential surface, and two axial end surfaces, wherein the outer circumferential surface and the inner circumferential surface each extend essentially around the main axis (X), wherein the axial end surfaces each extend essentially perpendicular to the main axis (X), wherein the at least two segments are spaced apart from each other in a circumferential direction such that an outer circumferential surface of each segment moves toward the main axis (X) when wear occurs at an inner circumferential surface of the segments, wherein the outer circumferential surface has the form of a part of an envelope surface of a cylinder, wherein the packing ring has at least one indicator means that indicates a position of the outer circumferential surface of at least one of the segments or a portion thereof in a radial direction (R) perpendicular to the main axis (X) of the packing ring, with the indicator means having a longitudinal axis extending in the radial direction (R), wherein the indicator means comprises at least one indicator pin, which is arranged on one of the at least two segments such that the indicator pin moves towards the main axis (X) along with the segment when the wear occurs, wherein the at least one indicator pin is arranged such that it extends away from the outer circumferential surface of the segment in the radial direction (R), wherein the packing ring comprises a tube spring, which is arranged in a common groove of the segments such that the tube spring applies a force to the segments in the radial direction (R), and wherein the at least one indicator pin is partly arranged in the groove so that it is held by the tube spring, and a sensor device which detects a position of the at least one indicator pin in a radial direction (R) perpendicular to the main axis (X) of the packing ring.

23. A method for detecting a condition of wear of a packing ring comprising:

the packing ring having at least two segments arranged around a common main axis (X), wherein each segment at least has an outer circumferential surface, an inner circumferential surface, and two axial end surfaces, wherein the outer circumferential surface and the inner circumferential surface each extend essentially around the main axis (X), wherein the axial end surfaces each extend essentially perpendicular to the main axis (X), wherein the at least two segments are spaced apart from each other in a circumferential direction such that an outer circumferential surface of each segment moves toward the main axis (X) when wear occurs at an inner circumferential surface of the segments, wherein the outer circumferential surface has the form of a part of an envelope surface of a cylinder, wherein the packing ring has at least one indicator means that indicates a position of the outer circumferential surface of at least one of the segments or a portion thereof in a radial direction (R) perpendicular to the main axis (X) of the packing ring, with the indicator means having a longitudinal axis extending in the radial direction (R), wherein the indicator means comprises at least one indicator pin, which is arranged on one of the at least two segments such that the indicator pin moves towards the main axis (X) along with the segment when the wear occurs, wherein the at least one indicator pin is arranged such that it extends away from the outer circumferential surface of the segment in the radial direction (R), wherein the packing ring comprises a tube spring, which is arranged in a common groove of the segments such that the tube spring applies a force to the segments in the radial direction (R), and wherein the at least one indicator pin is partly arranged in the groove so that it is held by the tube spring;

and/or that of a sealing device having the packing ring with the following steps:

arranging a sensor device so that it interacts with the at least one indicator pin arranged on one of the at least two segments;

establishing a start position of the at least one indicator pin along a radial direction (R);

determining at least one position of the at least one indicator pin along the radial direction (R) of the at least one indicator pin relative to the start position by means of the sensor device.

24. The method according to claim 23, wherein the position of the at least one indicator pin is plotted as a function against time.

25. The method according to claim 23, wherein at the beginning of the method an end value for the position of the at least one indicator pin is established, the position so determined is compared to the end value, and a warning is given upon reaching or surpassing the end value.

26. The method according to claim 23, wherein the determination of the position of the at least one indicator pin is done by a distance measurement.

27. The method according to claim 26, wherein the distance measurement is done between a sensor element and the at least one indicator pin.

28. The method according to claim 23, wherein the determination of the position of the at least one indicator pin is done by an optical measurement or a measurement using eddy current.

* * * * *